(12) United States Patent
Park et al.

(10) Patent No.: US 10,488,884 B2
(45) Date of Patent: Nov. 26, 2019

(54) FLEXIBLE TOUCH PANEL AND FLEXIBLE DISPLAY DEVICE

(71) Applicant: Samsung Display Co., Ltd., Yongin-Si, Gyeonggi-Do (KR)

(72) Inventors: Jung Mok Park, Hwaseong-si (KR); Young Sik Kim, Cheonan-si (KR); Hyung Chul Kim, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/149,036

(22) Filed: Oct. 1, 2018

(65) Prior Publication Data

US 2019/0033918 A1    Jan. 31, 2019

Related U.S. Application Data

(63) Continuation of application No. 14/823,805, filed on Aug. 11, 2015, now Pat. No. 10,114,419.

(30) Foreign Application Priority Data

Jan. 9, 2015   (KR) .................. 10-2015-0003526

(51) Int. Cl.
*G06F 1/16*      (2006.01)
*G06F 3/044*     (2006.01)

(52) U.S. Cl.
CPC .......... *G06F 1/1643* (2013.01); *G06F 1/1652* (2013.01); *G06F 3/044* (2013.01); *G06F 2203/04102* (2013.01); *G06F 2203/04103* (2013.01)

(58) Field of Classification Search
CPC ................. G06F 1/1652; G06F 1/1643; G06F 2203/04102; G06F 2202/40103
See application file for complete search history.

(56) References Cited

U.S. PATENT DOCUMENTS

| | | | |
|---|---|---|---|
| 2010/0295812 A1 | 11/2010 | Burns et al. | |
| 2012/0243151 A1* | 9/2012 | Lynch ................. | H04M 1/0202 361/679.01 |
| 2012/0313877 A1 | 12/2012 | Han | |
| 2014/0183473 A1 | 7/2014 | Lee et al. | |
| 2014/0240985 A1 | 8/2014 | Kim et al. | |

FOREIGN PATENT DOCUMENTS

| | | |
|---|---|---|
| KR | 10-0956238 B1 | 5/2010 |
| KR | 10-1071708 B1 | 10/2011 |
| KR | 10-1169250 B1 | 8/2012 |
| KR | 10-2014-0062269 A | 5/2014 |

\* cited by examiner

*Primary Examiner* — Dennis P Joseph
(74) *Attorney, Agent, or Firm* — Innovation Counsel LLP

(57) ABSTRACT

A flexible touch panel may include a flexible substrate. The flexible touch panel may further include a touch sensor layer that overlaps the flexible substrate. The flexible touch panel may further include a compensation film that overlaps the touch sensor layer and is configured to enable a neutral plane associated with the flexible touch panel to be positioned in the touch sensor layer when the flexible touch panel is bent.

8 Claims, 6 Drawing Sheets

FLEXIBLE TOUCH PANEL AND FLEXIBLE DISPLAY DEVICE

CROSS-REFERENCE TO RELATED APPLICATION

This application is a continuation application of U.S. patent application Ser. No. 14/823,805 filed on Aug. 11, 2015, which claims priority under 35 U.S.C. § 119 of Korean Patent Application No. 10-2015-0003526, filed on Jan. 9, 2015, the entire contents of which are hereby incorporated by reference.

BACKGROUND

(a) Field

The technical field is related to a flexible touch panel and a flexible display device.

(b) Description of the Related Art

A touch panel may be disposed at a display area of a display device for recognizing touches provided by a user of the display device. The touch panel may function as an input device of the display device. The above information disclosed in this Background section is for enhancement of understanding of the background. The Background section may contain information that does not form the prior art that is already known in this country to a person of ordinary skill in the art.

SUMMARY

An embodiment may be related to a flexible touch panel. The flexible touch panel may include a flexible substrate. The flexible touch panel may further include a touch sensor layer that overlaps the flexible substrate. The flexible touch panel may further include a compensation film that overlaps the touch sensor layer and is configured to enable a neutral plane associated with the flexible touch panel to be positioned in the touch sensor layer when the flexible touch panel is bent.

The compensation film may have a multilayer structure.

The touch sensor layer may be positioned between the flexible substrate and the compensation film.

Two opposite sides of the touch sensor layer may directly contact the flexible substrate and the compensation film, respectively.

The flexible touch panel may include a covering member. The touch sensor layer may include a touch sensor unit and a wiring unit electrically connected to the touch sensor unit. The covering member may conceal the wiring unit without substantially concealing the touch sensor unit.

An embodiment may be related to a method for manufacturing a flexible touch panel. The method may include the following steps: providing a touch sensor layer; determining at least one of a thickness of a compensation film and a material of the compensation film for enabling a neutral plane associated with the flexible touch panel to be positioned in the touch sensor layer when the flexible touch panel may be bent; and providing the compensation film such that the compensation film overlaps the touch sensor layer.

The method may include providing the touch sensor layer on a substrate. The thickness of the compensation film may be determined based on at least a material of the compensation layer, a thickness of the touch sensor layer, and a thickness of the substrate.

The method may include providing a covering member that partially overlaps the touch sensor layer without completely overlapping the touch sensor layer. The thickness of the compensation film may be determined based on at least a thickness of the covering member.

A embodiment may be related to flexible display device that may include the following elements: a flexible display panel; a touch sensor layer overlapping the flexible display panel; and a compensation film overlapping the touch sensor layer and configured to enable a neutral plane associated with the flexible display device to be positioned in the touch sensor layer when the flexible display device is bent.

The compensation film may include an organic layer and an inorganic layer.

The touch sensor layer may directly contact the compensation film.

The flexible display device may include a viscoelastic layer positioned between the compensation film and the flexible display panel.

The flexible display device may include a covering member that directly contacts the compensation film. The touch sensor layer may include a touch sensor unit and a wiring unit electrically connected to the touch sensor unit. The covering member may conceal the wiring unit.

The flexible display device may include the following elements: a flexible substrate that directly contacts the touch sensor layer; and a covering member that directly contacts the flexible substrate. The compensation film may be positioned between the flexible substrate and the flexible display panel. The touch sensor layer may include a touch sensor unit and a wiring unit electrically connected to the touch sensor unit. The covering member may conceal the wiring unit.

The flexible display device may include the following elements: a flexible transparent window overlapping the touch sensor layer; and a viscoelastic layer positioned between the touch sensor layer and the flexible transparent window.

The flexible display device may include a blocking member that may be opaque and may directly contact the flexible transparent window. The touch sensor layer may include a touch sensor unit and a wiring unit electrically connected to the touch sensor unit. The blocking member may partially overlap the wiring unit without completely overlapping the wiring unit.

The flexible display device may include a covering member that partially overlaps the touch sensor layer without completely overlapping the touch sensor layer. The touch sensor layer may include a touch sensor unit and a wiring unit electrically connected to the touch sensor unit. The covering member may substantially conceal the wiring unit without concealing the touch sensor unit.

The covering member may include a comb pattern.

The flexible display device may include an opaque blocking member that overlaps a non-display area of the flexible display panel. The opaque blocking member may partially overlap the covering member without completely overlapping the covering member.

The flexible display device may include a viscoelastic layer that overlaps the touch sensor layer. The covering member may be positioned inside the viscoelastic layer.

The viscoelastic layer may directly contact the compensation film.

An embodiment may be related to a flexible touch panel that includes the following elements: a flexible substrate; a touch sensor layer formed on the flexible substrate; and a compensation film positioned on the touch sensor layer.

When a bending moment is applied to the flexible touch panel, a neutral plane may be positioned in the touch sensor layer.

The touch sensor layer may contact the flexible substrate and the compensation film, respectively.

The touch sensor layer may include: a touch sensor unit formed in a central region of the flexible substrate; and a wiring unit formed in a peripheral region of the flexible substrate.

The compensation film may include a covering member which covers the wiring unit.

The touch sensor unit may include transparent conductive oxide.

An embodiment may be related to a flexible display device that includes the following elements: a flexible display panel; a flexible touch panel including a flexible substrate positioned on the flexible display panel, a compensation film facing the flexible substrate, and a touch sensor layer positioned between the flexible substrate and the compensation film and formed on the flexible substrate; and a first viscoelastic layer positioned between the flexible display panel and the flexible touch panel.

When a bending moment is applied to the flexible touch panel, a neutral plane may be positioned in the touch sensor layer.

The touch sensor layer may contact the flexible substrate and the compensation film, respectively.

The flexible display panel may include the following elements: a display area for displaying an image; and a non-display area adjacent to the display area, and the touch sensor layer may include: a touch sensor unit formed in a central region of the flexible substrate, corresponding to the display area; and a wiring unit formed in an peripheral region of the flexible substrate, corresponding to the non-display area.

The flexible substrate may be positioned between the compensation film and the flexible display panel, and the compensation film may include a covering member that covers the wiring unit.

The compensation film may be positioned between the flexible substrate and the flexible display panel, and the flexible substrate may include a covering member which covers the wiring unit.

The flexible display device may further include the following elements: a flexible window positioned on the flexible touch panel; and a second viscoelastic layer positioned between the flexible touch panel and the flexible window.

An embodiment may be related to a flexible display device that includes the following elements: a flexible display panel; a touch sensor layer formed on the flexible display panel; and a compensation film positioned on the touch sensor layer.

When a bending moment is applied to the flexible touch panel, a neutral plane may be positioned in the touch sensor layer.

The flexible display panel may include the following elements: a display area for displaying an image; and a non-display area adjacent to the display area, and the touch sensor layer may include the following elements: a touch sensor unit formed in a central region of the flexible display panel, corresponding to the display area; and a wiring unit formed in an peripheral region of the flexible display panel, corresponding to the non-display area.

The compensation film may include a covering member that covers the wiring unit.

An embodiment may be related to a flexible display device that includes the following elements: a flexible display panel including a touch sensor layer formed therein; and a compensation film positioned on the flexible display panel.

When a bending moment is applied to the flexible touch panel, a neutral plane may be positioned in the touch sensor layer.

The flexible display panel may include the following elements: a display area displaying an image; and a non-display area adjacent to the display area, the touch sensor layer may include: a touch sensor unit formed in a central region of the flexible display panel, corresponding to the display area; and a wiring unit formed in an peripheral region of the flexible display panel, corresponding to the non-display area, and the compensation film may include a covering member that covers the wiring unit.

According to embodiments, flexible touch panels and/or flexible display devices may have satisfactory durability against repetitive bending.

DETAILED DESCRIPTION OF EMBODIMENTS

Figure 1:
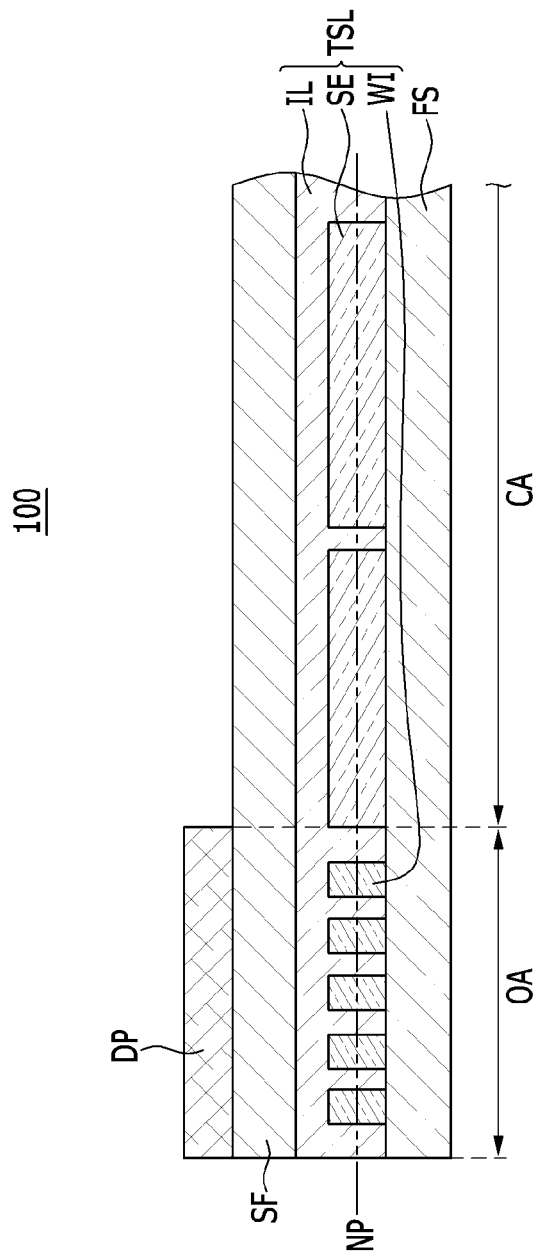
FIG. 1 is a schematic cross-sectional view illustrating a portion of a flexible touch panel according to an embodiment.

Embodiments are described by way of illustration with reference to the accompanying drawings. As those skilled in the art would realize, the described embodiments may be modified in various different ways, all without departing from the spirit or scope.

The drawings and description are to be regarded as illustrative in nature and not restrictive. Like reference numerals may designate like elements in the specification. Description of like elements may be not repeated.

Although the terms "first", "second", etc. may be used herein to describe various elements, these elements, should not be limited by these terms. These terms may be used to distinguish one element from another element. Thus, a first element discussed below may be termed a second element without departing from the teachings. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the drawings, thicknesses of layers, films, panels, regions, etc., may be exaggerated for clarity.

In the description, when a first element (such as a layer, film, region, or substrate) is referred to as being "on" a second element, the first element can be directly on the second element, or one or more intervening elements may also be present.

Unless explicitly described to the contrary, the word "comprise" and variations such as "comprises" or "comprising", will be understood to imply the inclusion of stated elements but not the exclusion of any other elements. In the description, the term "connect" may mean "electrically connect"; the term "insulate" may mean "electrically insulate".

FIG. 1 is a schematic cross-sectional view illustrating a portion (e.g., an end portion) of a flexible touch panel 100 according to an embodiment. The flexible touch panel 100 is a touch recognition device and may be flexible, stretchable, foldable, bendable, and/or rollable. The flexible touch panel 100 includes a flexible substrate FS, a touch sensor layer TSL, and a compensation film SF.

The flexible substrate FS may be flexible, stretchable, foldable, bendable, and/or rollable. The flexible substrate FS is flexible, stretchable, foldable, bendable, and/or rollable, such that an entire flexible touch panel 100 may be flexible, stretchable, foldable, bendable, and/or rollable. For example, the flexible substrate FS may be a flexible film formed of a resin, such as polyimide.

The touch sensor layer TSL is formed on the flexible substrate FS.

The touch sensor layer TSL is positioned between the flexible substrate FS and the compensation film SF. Two opposite sides of the touch sensor layer TSL may directly contact the flexible substrate FS and the compensation film SF, respectively. The touch sensor layer TSL includes a touch sensor unit SE, a wiring unit WI, and an insulating layer IL.

The touch sensor unit SE is a touch recognition sensor and may be positioned in a central region CA of the flexible substrate FS. The touch sensor unit SE includes transparent conductive oxide such as indium tin oxide (ITO) and/or indium zinc oxide (IZO). The touch sensor unit SE may be one of a mutual capacitance type touch sensor, a self-capacitance type touch sensor, etc. The touch sensor unit SE may have one or more known structures.

The wiring unit WI is connected to the touch sensor unit SE, may be positioned in a peripheral region OA (or edge region OA) of the flexible substrate FS, and may be positioned adjacent to the touch sensor unit SE. The wiring unit WI includes metals such as at least one of copper, gold, silver, platinum, and tungsten. The wiring unit WI may be electrically connected between the touch sensor unit SE and a touch driver (not illustrated) and may transfer a signal between the touch sensor unit SE and the touch driver. If the wiring unit WI may connect between the touch sensor unit SE and the touch driver, the wiring unit WI may be formed to have any structure.

The insulating layer IL covers the touch sensor unit SE and the wiring unit WI. A portion of the insulating layer IL may be positioned between adjacent touch sensor units SEs for preventing short-circuit between the adjacent touch sensor units SEs and for enabling capacitance to be provided between the adjacent sensor units SEs. The insulating layer IL may include one or more organic materials, such as polymer, and/or may include one or more inorganic materials, such as at least one of oxide, nitride, and the like. For example, the insulating layer IL may include a viscoelastic material and/or may include at least one of silicon oxide (SiOx) and silicon nitride (SiNx).

The touch sensor layer TSL may be a central layer of the flexible touch panel 100. When the flexible touch panel 100 is bent, a neutral plane NP may be positioned in the touch sensor layer TSL.

The compensation film SF is positioned on the touch sensor layer TSL and directly contact the touch sensor layer TSL. The compensation film SF may be attached to the touch sensor layer TSL. The compensation film SF may include at least one of an organic layer and an inorganic layer. The compensation film SF may a laminate including a plurality of layers. In a method for manufacturing the flexible touch panel 100, a thickness of the compensation film SF may be determined and/or configured based on a Young's modulus of the compensation film SF a material of the compensation film SF, one or more Young's modulus values of one or more elements of the flexible touch panel 100, and/or one or more thicknesses of one or more elements of the flexible touch panel 100 (e.g., the thickness of the flexible substrate FS and/or the thickness of the covering member DP) so that when the flexible touch panel 100 is bent, a neutral plane NP is positioned inside the touch sensor layer TSL. That is, the compensation film SF is configured to control a position of the neutral plane formed inside the flexible touch panel 100 when the bending moment is applied to the flexible touch panel 100.

The flexible touch panel 100 includes a covering member DP, which may be opaque and may overlap and/or cover the wiring unit WI. The covering member DP may be positioned on an upper surface of the compensation film SF, on a lower surface of the compensation film SF, or inside the compensation film SF. The covering member DP may be/include a light blocking member for concealing the wiring unit WI from being visible or conspicuous. The decoration pattern DP is formed on the compensation film SF contacting the touch sensor layer TSL. Even if the overall flexible touch panel 100 is bent, the wiring unit WI may remain concealed and/or inconspicuous.

In an embodiment, the covering member DP may include a pattern, such as a comb pattern.

Figure 2:
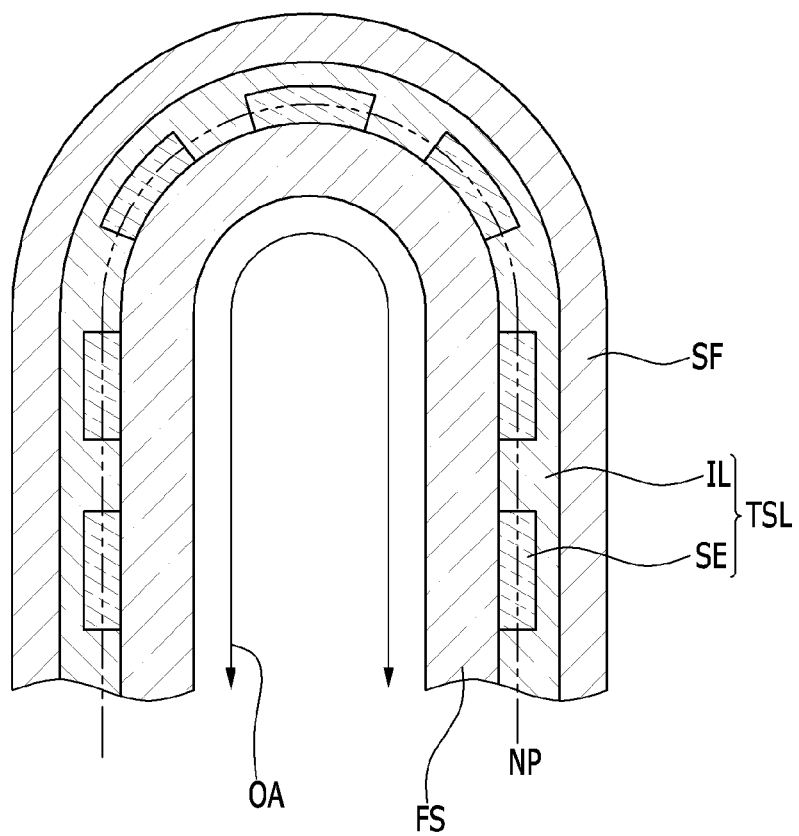
FIG. 2 is a schematic cross-sectional view illustrating a portion of a bent flexible touch panel according to an embodiment.

FIG. 2 is a schematic cross-sectional view illustrating a portion (e.g., a central portion) of the flexible touch panel 100 when the flexible touch panel 100 is bent according to an embodiment.

As illustrated in FIG. 2, when the flexible touch panel 100 is bent, a position of the neutral plane NP is controlled by the compensation film SF, and thus the neutral plane NP may be positioned in the touch sensor layer TSL. The neutral plane NP may be positioned between the compensation film SF, which may undergo tension, and the flexible substrate FS, which may undergo compression.

The neutral plane NP is positioned in the touch sensor layer TSL, and thus when the flexible touch panel 100 is bent, the touch sensor layer TSL may substantially keep an original length without significantly expanding or contracting. Therefore, the touch sensor layer TSL may be prevented from significant damage even if the flexible touch panel 100 is bent repeatedly. In detail, the touch sensor unit SE of the touch sensor layer TSL is made of the transparent conductive oxide having brittleness as compared with metal and thus may be easily broken by the stress, but in the flexible touch panel 100 according to an embodiment, when the bending moment is applied, since the neutral plane NP is formed in the touch sensor unit SE of the touch sensor layer TSL, the touch sensor unit SE of the touch sensor layer TSL is prevented from being broken due to the stress. Advantageously, reliability and/or durability of the flexible touch panel 100 may be satisfactory.

Further, in the flexible touch panel 100 according to an embodiment, the compensation film SF includes the decoration pattern DP positioned to correspond to the wiring unit WI of the touch sensor unit SE to prevent the wiring unit WI from being visualized from the outside, and therefore an additional configuration for preventing the wiring unit WI from being visualized from the outside is not required.

Hereinafter, a flexible display device according to an embodiment will be described with reference to FIG. 3.

Figure 3:
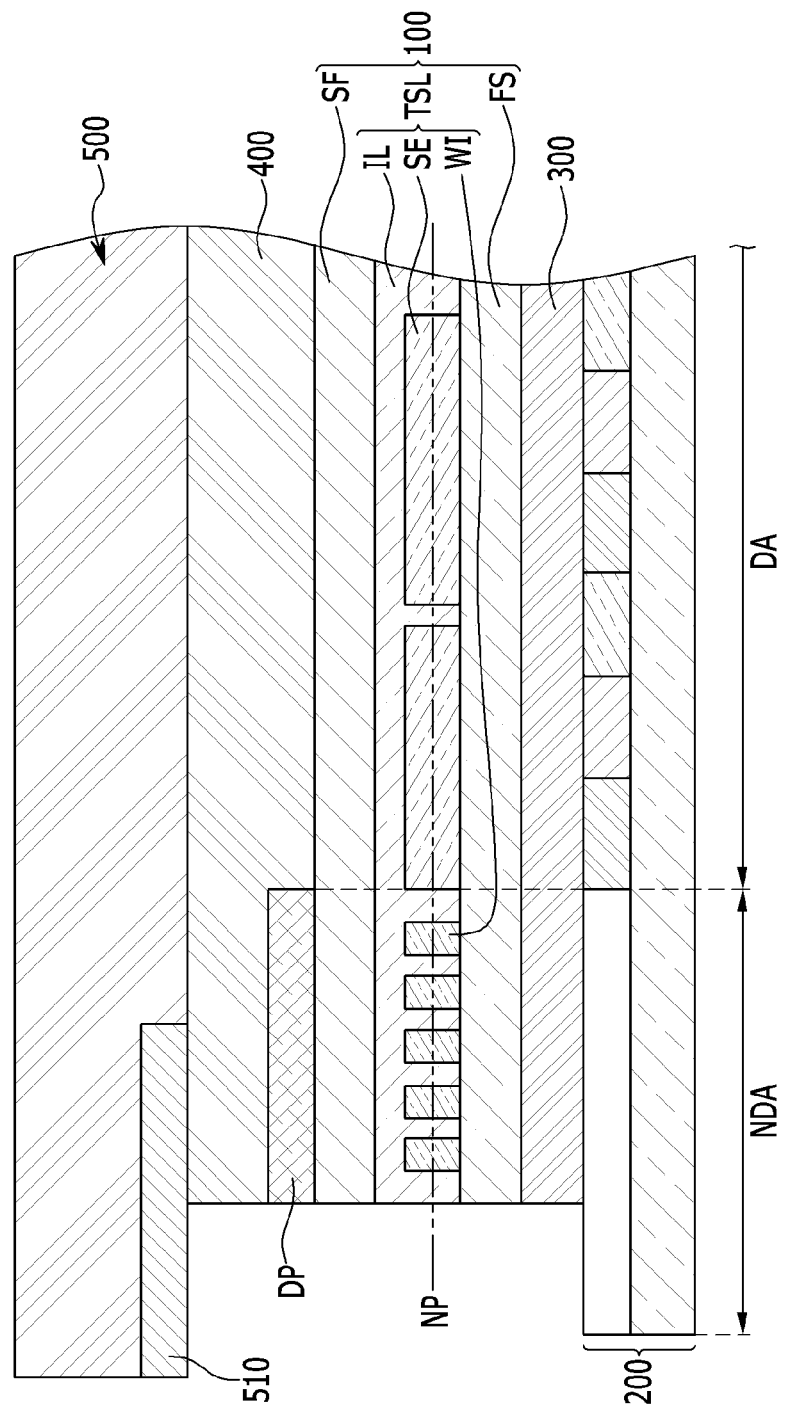
FIG. 3 is a schematic cross-sectional view illustrating a portion of a flexible display device according to an embodiment.

FIG. 3 is a schematic cross-sectional view illustrating a portion (e.g., an end portion) of a flexible display device 1000 according to an embodiment.

As illustrated in FIG. 3, the flexible display device 1000 may be flexible, stretchable, foldable, bendable, and/or rollable and includes a flexible display panel 200, a first viscoelastic layer 300, the flexible touch panel 100, a second viscoelastic layer 400, and a flexible window 500.

The flexible display panel 200 may be flexible, stretchable, foldable, bendable, and/or rollable and includes a display area DA for displaying an image and a non-display area NDA that is adjacent to the display area DA. The flexible display panel 200 may be an organic light emitting display device including an organic light emitting diode. In one or more embodiments, the flexible display panel 200 may be/include one or more of a liquid crystal display (LCD), a plasma display (PD), a field emission display (FED), an electrophoretic display (EPD), an electrowetting display (EWD), etc.

The first viscoelastic layer 300 is positioned between the flexible display panel 200 and the flexible touch panel 100 and includes a viscoelastic material. The first viscoelastic layer 300 may be/include a pressure sensitive adhesive (PSA) and/or one or more of other viscoelastic materials.

The flexible touch panel 100 may have one or more of the features discussed above with reference to FIG. 1 and FIG. 2. The flexible touch panel 100 is a touch recognition device and may be flexible, stretchable, foldable, bendable, or rollable. The flexible touch panel 100 includes a flexible substrate FS, a touch sensor layer TSL, and a compensation film SF.

The flexible substrate FS may be flexible, stretchable, foldable, bendable, or rollable. The flexible substrate FS is flexible, stretchable, foldable, bendable, or rollable, such that an entire flexible touch panel 100 may be flexible, stretchable, foldable, bendable, or rollable. For example, the flexible substrate FS may have a form of a flexible film including a resin such as polyimide. The flexible substrate FS is positioned on the flexible display panel 200 and is positioned between the compensation film SF and the flexible display panel 200.

The touch sensor layer TSL is formed on the flexible substrate FS.

The touch sensor layer TSL is positioned between the flexible substrate FS and the compensation film SF and contacts the flexible substrate FS and the compensation film SF, respectively. The touch sensor layer TSL includes the touch sensor unit SE, the wiring unit WI, and the insulating layer IL.

The touch sensor unit SE may overlap the display area DA of the flexible display panel 200. The wiring unit WI may overlap the non-display area NDA of the flexible display panel 200. The wiring unit WI includes metals such as copper, gold, silver, platinum, and tungsten. The wiring unit WI connects between the touch sensor unit SE and a touch driver (not illustrated) and serves to transfer a signal between the touch sensor unit SE and the touch driver. If the wiring unit WI may connect between the touch sensor unit SE and the touch driver, the wiring unit WI may be formed to have any structure.

The insulating layer IL covers the touch sensor unit SE and the wiring unit WI and may be a portion in which capacitance is formed between adjacent touch sensor units SEs while preventing a short-circuit between the adjacent touch sensor units SEs. The insulating layer IL may include organic materials such as polymer or inorganic materials including at least one of oxide, nitride, and the like. For example, the insulating layer IL may include a viscoelastic material or may include at least one of silicon oxide (SiOx) and silicon nitride (SiNx).

The touch sensor layer TSL may be positioned as the central layer of the overall flexible touch panel 100 and when the bending moment is applied to the flexible display device 1000, the neutral plane of the flexible touch panel 100 may be formed on the touch sensor layer TSL.

The compensation film SF is positioned on the touch sensor layer TSL, and in detail, contacts the touch sensor layer TSL. The compensation film SF may be attached to the touch sensor layer TSL. The compensation film SF may include at least one of an organic layer and an inorganic layer and may be formed as a laminate in which a plurality of layers is formed. The compensation film SF may have various thicknesses depending on Young's modulus of the compensation film SF itself. For example, the compensation film SF may have various thicknesses depending on Young's modulus of a material forming the compensation film SF so that when the bending moment is applied to the flexible display device 1000, the neutral plane formed on the flexible touch panel 100 is formed on the touch sensor layer TSL. That is, the compensation film SF is configured to control the position of the neutral plane formed inside the flexible touch panel 100 when the bending moment is applied to the flexible touch panel 100.

The compensation film SF includes the decoration pattern DP which covers the wiring unit WI. The decoration pattern DP is positioned to correspond to the wiring unit WI of the touch sensor layer TSL and may be formed on the upper surface and the lower surface of compensation film SF or inside the compensation film SF. The decoration pattern DP is a light blocking member and the decoration pattern DP is positioned to correspond to the wiring unit WI to suppress the wiring unit WI of the touch sensor layer TSL from being visualized from the outside. The decoration pattern DP is formed on the compensation film SF contacting the touch sensor layer TSL, and therefore even though the overall flexible display device 1000 is bent, the wiring unit WI of the flexible touch panel 100 is suppressed from being visualized from the outside. The compensation film SF faces the flexible substrate FS, having the touch sensor layer TSL disposed therebetween. The second viscoelastic layer 400 is positioned between the flexible touch panel 100 and the flexible window 500 and includes a viscoelastic material. The second viscoelastic layer 400 may be/include a pressure sensitive adhesive (PSA) and/or one or more other viscoelastic materials.

The flexible window 500 is positioned on the flexible touch panel 100 and may be flexible, stretchable, foldable, bendable, and/or rollable. The flexible window 500 may be transparent, such that images displayed by the flexible display panel 200 may be visible to a user of the flexible display device 1000. The flexible window 500 includes a blocking member 510 that is opaque and overlaps the non-display area (NDA) of the flexible display panel 200.

According to an embodiment, when the flexible display device 1000 is bent, the first viscoelastic layer 300 and the second viscoelastic layer 400 may deform, and different neutral planes may exist in the flexible window 500, the flexible touch panel 100, and the flexible display panel 200, respectively.

In an embodiment, in the flexible touch panel 100, the compensation film SF may enable the neutral plane NP to be positioned in the touch sensor layer TSL. Therefore, the touch sensor layer TSL may be prevented from significant damage even if the flexible display device 1000 is bent repeatedly. Advantageously, reliability and/or durability of the flexible display device 1000 may be satisfactory.

The neutral plane NP is formed on the touch sensor layer TSL, and thus when the bending moment is applied to the flexible display device 1000, the touch sensor layer TSL is bent while keeping an original length without being expanded or contracted due to unique characteristics of the neutral plane NP, such that even though stress is repeatedly applied to the flexible display device 1000 or stress over breaking strength is applied to the flexible display device 1000, the touch sensor layer TSL is prevented from being broken due to the stress.

In detail, the touch sensor unit SE of the touch sensor layer TSL is made of the transparent conductive oxide having brittleness as compared with metal and thus may be easily broken by the stress, but in the flexible display device 1000 according to an embodiment, when the bending moment is applied, the first viscoelastic layer 300 and the second viscoelastic layer 400 are each deformed and thus different neutral planes are formed on the flexible window 500, the flexible touch panel 100, and the flexible display panel 200, respectively, such that the stress applied to the whole flexible display device 1000 is relaxed, and at the same time, the neutral plane NP formed on the flexible touch panel 100 is formed on the touch sensor unit SE, such that the touch sensor unit SE of the touch sensor layer TSL is prevented from being broken due to the stress. That is, the flexible display device 1000 having improved durability against the repetitive bending is provided.

In an embodiment, the compensation film SF includes the covering member DP may sufficiently conceal the wiring unit WI of the touch sensor unit SE. Therefore, no additional configuration for concealing the wiring unit WI may be required. For example, the blocking member 510 of the flexible window 500 may not need to overlap the wiring unit WI, such that a width of the flexible window 500 may be minimized. Advantageously, the size of the flexible display device 1000 may be minimized.

Further, the wiring unit WI of the flexible touch panel 100 is blocked by the decoration pattern DP of the flexible touch panel 100 itself, and thus the wiring unit WI of the flexible touch panel 100 is prevented from being visualized from the outside independent of the position of the blocking member 510 of the flexible window 500, such that the blocking member 510 of the flexible window 500 need not overlap the wiring unit WI.

Hereinafter, a flexible display device according to an embodiment will be described with reference to FIG. 4.

Figure 4:
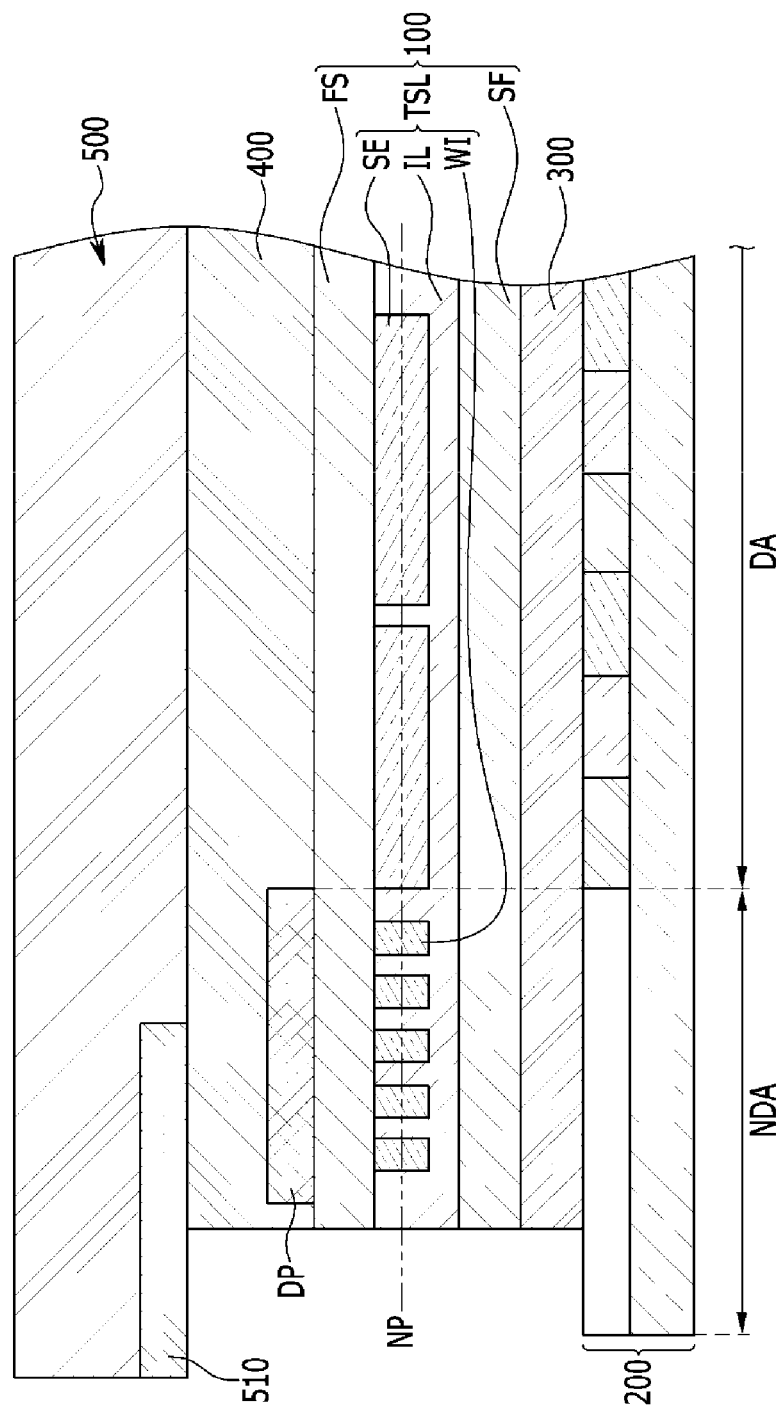
FIG. 4 is a schematic cross-sectional view illustrating a portion of a flexible display device according to an embodiment.

FIG. 4 is a schematic cross-sectional view illustrating a portion (e.g., an end portion) of a flexible display device 1000 according to an embodiment. The flexible display device 1000 may have one or more of the features discussed above with reference to FIG. 1, FIG. 2, and FIG. 3. The flexible display device 1000 includes a flexible display panel 200, a first viscoelastic layer 300, a flexible touch panel 100, a second viscoelastic layer 400, and a flexible window 500, which may have one or more of the features discussed above with reference to FIG. 1, FIG. 2, and FIG. 3.

The flexible touch panel 100 may have one or more of the features of the flexible touch panel 100 discussed with reference to FIG. 1, FIG. 2, and FIG. 3. The flexible touch panel 100 includes a flexible substrate FS, a touch sensor layer TSL, a compensation film SF, and a covering member DP. The covering member DP of the flexible touch panel 100 may have one or more of the features of the covering member 100 discussed with reference to FIG. 1, FIG. 2, and FIG. 3. In the flexible touch panel 100, the covering member DP may be positioned on an upper surface of the flexible substrate FS, on a lower surface of the flexible substrate FS, or inside the flexible substrate FS. Even if the flexible display device 1000 is bent, the covering member DP may effectively and/or substantially conceal the wiring unit WI.

The flexible substrate FS is positioned on the flexible display panel 200, having the touch sensor layer TSL and the compensate film SF disposed therebetween. The touch sensor layer TSL is formed on the flexible substrate FS. The flexible substrate FS includes the decoration pattern DP which covers the wiring unit WI. The decoration pattern DP is positioned to correspond to the wiring unit WI of the touch sensor layer TSL and may be formed on an upper surface and a lower surface of the flexible substrate FS or inside the flexible substrate FS. The decoration pattern DP is a light blocking member and the decoration pattern DP is positioned to correspond to the wiring unit WI to suppress the wiring unit WI of the touch sensor layer TSL from being visualized from the outside. The decoration pattern DP is formed on the flexible substrate FS contacting the touch sensor layer TSL, and therefore even though the overall flexible display device 1000 is bent, the wiring unit WI of the flexible touch panel 100 is suppressed from being visualized from the outside. The compensation film SF faces the flexible substrate FS, having the touch sensor layer TSL disposed therebetween.

The touch sensor layer TSL is positioned between the flexible substrate FS and the compensation film SF and contacts the flexible substrate FS and the compensation film SF, respectively. The touch sensor layer TSL includes the touch sensor unit SE, the wiring unit WI, and the insulating layer IL.

The touch sensor layer TSL may be positioned as the central layer of the overall flexible touch panel 100 and when the bending moment is applied to the flexible display device 1000, the neutral plane of the flexible touch panel 100 may be formed on the touch sensor layer TSL.

In the flexible display device 1000, the compensation film SF is positioned between the flexible substrate FS and the flexible display panel 200 and directly contacts each of the insulating layer IL of the touch sensor layer TSL and the first viscoelastic layer 300. The flexible substrate FS is positioned between the compensation film SF and the flexible window 500 and directly contacts each of the touch sensor layer TSL and the second viscoelastic layer 400. A thickness of the compensation film SF and/or a material of the compensation film SF may be configured and/or determined to enable a neutral plane of the flexible touch panel 100 to be positioned in the touch sensor layer TSL when the flexible touch panel 100 is bent and/or when the flexible display device 1000 is bent. Therefore, the touch sensor layer TSL may be prevented from significant damage even if the flexible display device 1000 is bent repeatedly. Advantageously, reliability and/or durability of the flexible display device 1000 may be satisfactory.

In the flexible display device 1000 according to an embodiment, when the bending moment is applied to the flexible display device 1000, the first viscoelastic layer 300 and the second viscoelastic layer 400 are each deformed depending on the stress applied to the flexible display device 1000 due to unique characteristics of the viscoelastic materials of each of the first viscoelastic layer 300 and the second viscoelastic layer 400, and therefore different neutral planes are formed on the flexible window 500, the flexible touch panel 100, and the flexible display panel 200, respectively, such that the stress applied to the whole flexible display device 1000 is relaxed.

In this case, the position of the neutral plane NP formed on the flexible touch panel 100 is controlled by the compensation film SF, and thus the neutral plane NP is formed on the touch sensor layer TSL. The neutral plane NP is formed on the touch sensor layer TSL, and thus when the bending moment is applied to the flexible display device 1000, the touch sensor layer TSL is bent while keeping an original length without being expanded or contracted due to unique characteristics of the neutral plane NP, such that even though stress is repeatedly applied to the flexible display device 1000 or stress over breaking strength is applied to the flexible display device 1000, the touch sensor layer TSL is prevented from being broken due to the stress.

In detail, the touch sensor unit SE of the touch sensor layer TSL is made of the transparent conductive oxide having brittleness as compared with metal and thus may be easily broken by the stress, but in the flexible display device 1000 according to an embodiment, when the bending moment is applied, the first viscoelastic layer 300 and the second viscoelastic layer 400 are each deformed and thus different neutral planes are formed on the flexible window 500, the flexible touch panel 100, and the flexible display panel 200, respectively, such that the stress applied to the whole flexible display device 1000 is relaxed, and at the same time, the neutral plane NP formed on the flexible touch panel 100 is formed on the touch sensor unit SE, such that the touch sensor unit SE of the touch sensor layer TSL is prevented from being broken due to the stress.

That is, the flexible display device 1000 having improved durability against the repetitive bending is provided.

Further, in the flexible display device 1000 according to an embodiment, the flexible substrate FS includes the decoration pattern DP positioned to correspond to the wiring unit WI of the touch sensor unit SE to prevent the wiring unit WI from being visualized from the outside, and therefore an additional configuration for preventing the wiring unit WI from being visualized from the outside is not required. As such, the wiring unit WI of the flexible touch panel 100 is blocked by the decoration pattern DP of the flexible touch panel 100 itself and thus the position of the end of the flexible touch panel 100 may move independent of the position of the blocking member 510 of the flexible window 500, such that the width of the non-display area of the whole flexible display device 1000 may be narrow.

Further, the wiring unit WI of the flexible touch panel 100 is blocked by the decoration pattern DP of the flexible touch panel 100 itself and thus the wiring unit WI of the flexible touch panel 100 is prevented from being visualized from the outside independent of the position of the blocking member 510 of the flexible window 500, such that the blocking member 510 of the flexible window 500 need not overlap the wiring unit WI.

Hereinafter, a flexible display device according to an embodiment will be described with reference to FIG. 5. Hereinafter, only configurations different from those of the flexible display device according to an embodiment described above will be described.

Figure 5:
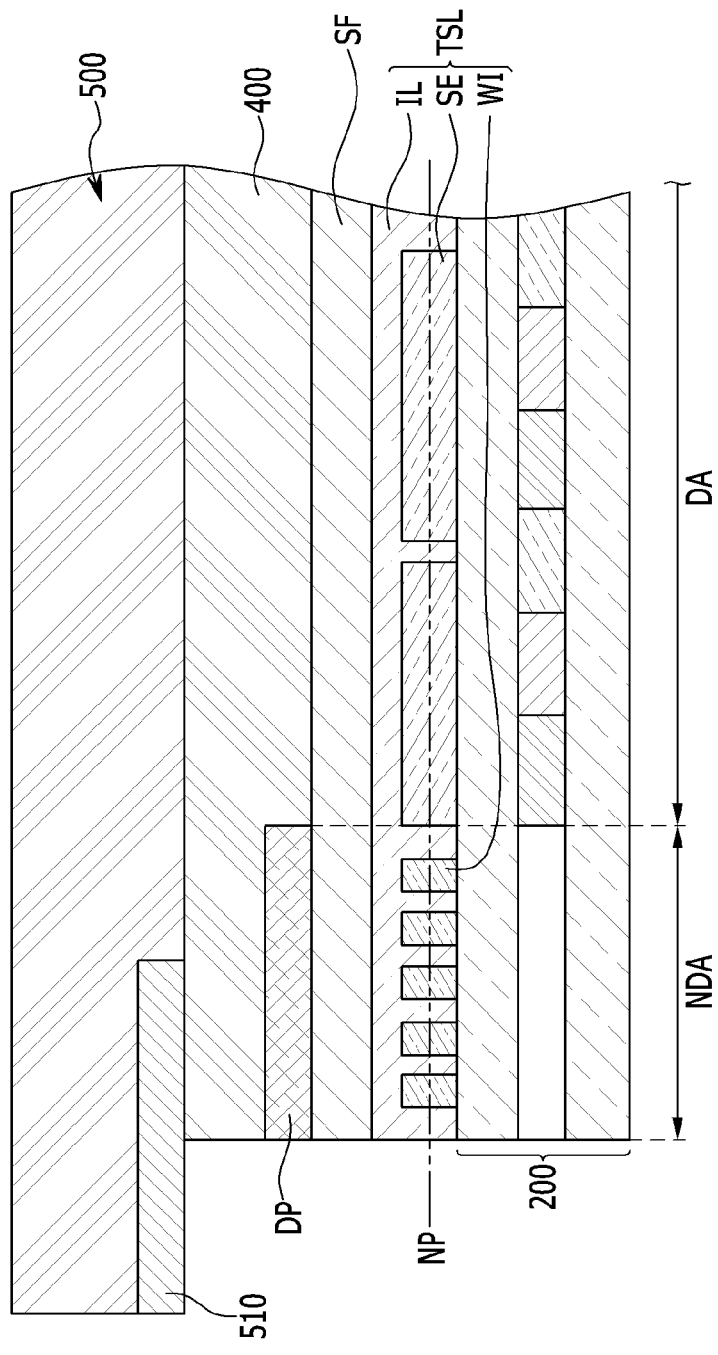
FIG. 5 is a schematic cross-sectional view illustrating a portion of a flexible display device according to an embodiment.

FIG. 5 is schematic a cross-sectional view illustrating a portion (e.g., an end portion) of a flexible display device 1000 according to an embodiment. The flexible display device 1000 may have one or more of the features discussed above with reference to FIG. 1, FIG. 2, and FIG. 3. The flexible display device 1000 includes a flexible display panel 200, a touch sensor layer TSL, a compensation film SF, a second viscoelastic layer 400, a flexible window 500, and a covering member DP, which may have one or more of the features discussed above with reference to FIG. 1, FIG. 2, and FIG. 3.

The flexible display panel 200 may include a viscoelastic layer in addition to elements configured for displaying images.

Two opposite sides of the touch sensor layer TSL may directly contact the viscoelastic layer the flexible display panel 200 and the compensation film SF, respectively. The touch sensor layer TSL may have one or more features discussed above with reference to FIG. 1, FIG. 2, and FIG. 3. A side surface of the touch sensor layer TSL may be aligned (i.e., flush or on a same plane) with a side of the flexible display 200 and may be perpendicular to the flexible window 500.

Two opposite sides of the compensation film SF may directly contact the touch sensor layer TSL and the second viscoelastic layer 400, respectively. A thickness of the compensation film SF and/or a material of the compensation film SF may be configured and/or determined to enable a neutral plane of the flexible display device 1000 to be positioned in the touch sensor layer TSL when the flexible display device 1000 is bent. Therefore, the touch sensor layer TSL may be prevented from significant damage even if the flexible display device 1000 is bent repeatedly. Advantageously, reliability and/or durability of the flexible display device 1000 may be satisfactory.

The compensation film SF may be attached to the touch sensor layer TSL. The compensation film SF may include at least one of an organic layer and an inorganic layer and may be formed as a laminate in which a plurality of layers is formed.

The compensation film SF may have various thicknesses depending on Young's modulus of the compensation film SF itself. For example, the compensation film SF may have various thicknesses depending on Young's modulus of a material forming the compensation film SF so that when the bending moment is applied to the flexible display device 1000, the neutral plane formed on the flexible display panel 200 is formed on the touch sensor layer TSL. That is, the compensation film SF is configured to control the position of the neutral plane formed inside the flexible display panel 200 when the bending moment is applied to the flexible display panel 200.

The compensation film SF includes the decoration pattern DP which covers the wiring unit WI. The decoration pattern DP is positioned to correspond to the wiring unit WI of the touch sensor layer TSL and may be formed on the upper surface and the lower surface of compensation film SF or inside the compensation film SF. The decoration pattern DP is a light blocking member and the decoration pattern DP is positioned to correspond to the wiring unit WI to suppress the wiring unit WI of the touch sensor layer TSL from being visualized from the outside. The decoration pattern DP is formed on the compensation film SF contacting the touch sensor layer TSL, and therefore even though the overall flexible display device 1000 is bent, the wiring unit WI of the touch sensor layer TSL is suppressed from being visualized from the outside.

In the flexible display device 1000 according to an embodiment, when the bending moment is applied to the flexible display device 1000, the second viscoelastic layer 400 is deformed depending on the stress applied to the flexible display device 1000 due to the unique characteristics of the viscoelastic materials of the second viscoelastic layer 400, and therefore different neutral planes are formed on the flexible window 500 and the flexible display panel 200, respectively, such that the stress applied to the whole flexible display device 1000 is relaxed.

In this case, the position of the neutral plane NP formed on the flexible display panel 200 is controlled by the compensation film SF, and thus the neutral plane NP is formed on the touch sensor layer TSL. The neutral plane NP is formed on the touch sensor layer TSL, and thus when the bending moment is applied to the flexible display device 1000, the touch sensor layer TSL is bent while keeping an original length without being expanded or contracted due to unique characteristics of the neutral plane NP, such that even though stress is repeatedly applied to the flexible display device 1000 or stress over breaking strength is applied to the flexible display device 1000, the touch sensor layer TSL is prevented from being broken due to the stress.

In detail, the touch sensor unit SE of the touch sensor layer TSL is made of the transparent conductive oxide having brittleness as compared with metal and thus may be easily broken by the stress, but in the flexible display device 1000 according to an embodiment, when the bending moment is applied, the second viscoelastic layer 400 is deformed and thus different neutral planes are formed on the flexible window 500 and the flexible display panel 200, respectively, such that the stress applied to the whole flexible display device 1000 is relaxed, and at the same time, the neutral plane NP formed on the flexible display panel 200 is formed on the touch sensor unit SE, such that the touch sensor unit SE of the touch sensor layer TSL is prevented from being broken due to the stress.

That is, the flexible display device 1000 having improved durability against repetitive bending is provided.

Further, in the flexible display device 1000 according to an embodiment, the compensation film SF includes the decoration pattern DP positioned to correspond to the wiring unit WI of the touch sensor unit SE to prevent the wiring unit WI from being visualized from the outside, and therefore an additional configuration for preventing the wiring unit WI from being visualized from the outside is not required. As such, the wiring unit WI of the touch sensor layer TSL is blocked by the decoration pattern DP of the compensation film SF, and thus the position of the end of the flexible display panel 200 may move independent of the position of the blocking member 510 of the flexible window 500, such that the width of the non-display area of the whole flexible display device 1000 may be narrow.

Further, the wiring unit WI of the flexible display panel 200 is blocked by the decoration pattern DP of the flexible display panel 200 itself and thus the wiring unit WI of the flexible display panel 200 is prevented from being visualized from the outside independent of the position of the blocking member 510 of the flexible window 500, such that the blocking member 510 of the flexible window 500 need not overlap the wiring unit WI.

Hereinafter, a flexible display device according to an embodiment will be described with reference to FIG. 6.

Figure 6:
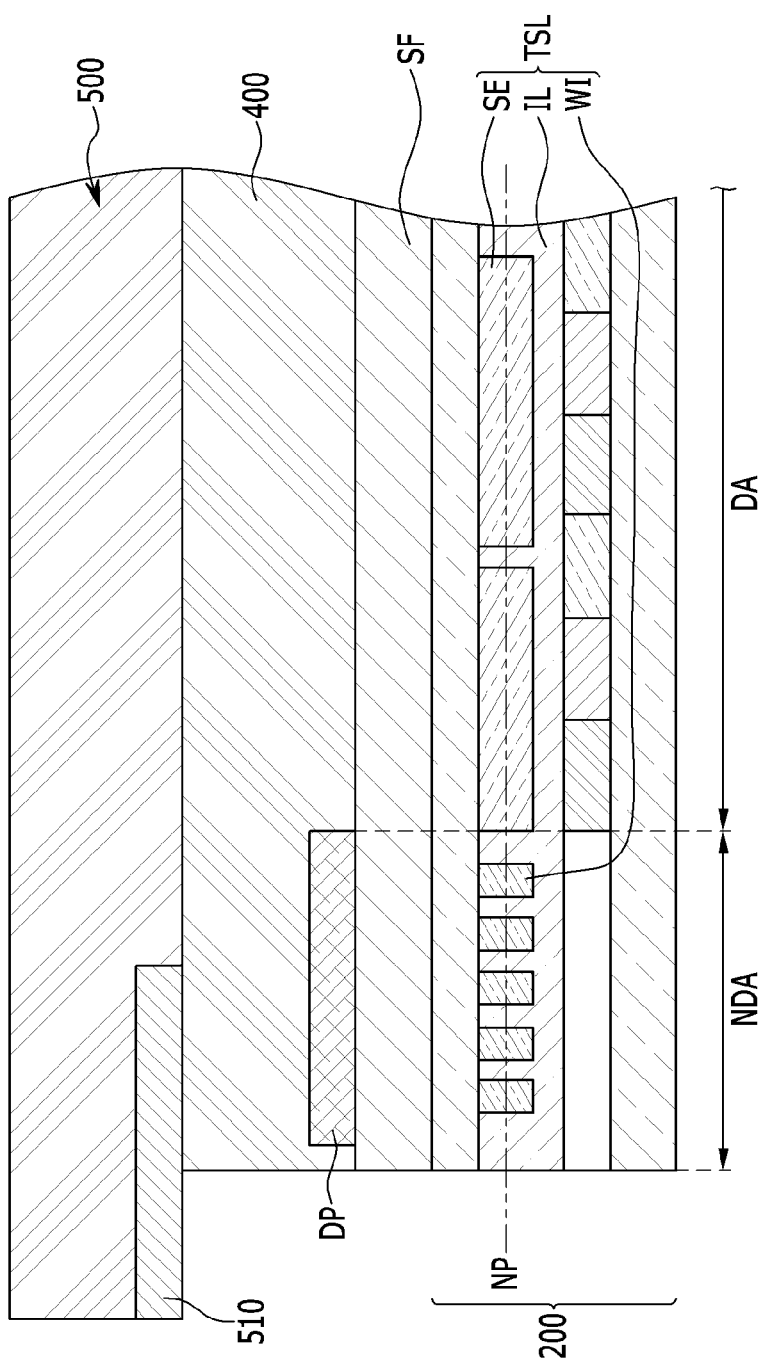
FIG. 6 is a schematic cross-sectional view illustrating a portion of a flexible display device according to an embodiment.

FIG. 6 is a schematic cross-sectional view illustrating a portion (e.g., an end portion) of a flexible display device 1000 according to an embodiment. The flexible display device 1000 may have one or more of the features discussed above with reference to FIG. 1, FIG. 2, FIG. 3, FIG. 4, and FIG. 5.

The flexible display device 1000 according includes a flexible display panel 200, a compensation film SF, a second viscoelastic layer 400, and a flexible window 500.

A touch sensor layer TSL is positioned inside the flexible display panel 200. The touch sensor layer TSL includes a touch sensor unit SE, a wiring unit WI, and an insulating layer IL. The touch sensor unit SE is positioned in the display area of the flexible display panel 200, and the wiring unit WI is positioned in the non-display area NDA of the flexible display panel 200.

The compensation film SF overlaps the touch sensor layer TSL and directly contacts the flexible display panel 200. The compensation film SF may be attached to the flexible display panel 200 and may be spaced (e.g., by an adhesive and/or a viscoelastic layer) from the touch sensor layer TSL. A thickness of the compensation film SF and/or a material of the compensation film SF may be configured and/or determined to enable a neutral plane of the flexible display panel 200 and/or the flexible display device 1000 to be positioned in the touch sensor layer TSL when the flexible display panel 200 and/or the flexible display device 1000 is bent. Therefore, the touch sensor layer TSL may be prevented from significant damage even if the flexible display panel 200 is bent repeatedly and/or even if the flexible display device 1000 is bent repeatedly. Advantageously, reliability and/or durability of the flexible display panel 200 and/or the flexible display device 1000 may be satisfactory.

The compensation film SF may include at least one of an organic layer and an inorganic layer and may be formed as a laminate in which a plurality of layers is formed. The compensation film SF may have various thicknesses depending on Young's modulus of the compensation film SF itself. For example, the compensation film SF may have various thicknesses depending on Young's modulus of a material forming the compensation film SF so that when the bending moment is applied to the flexible display device 1000, the neutral plane formed on the flexible display panel 200 is formed on the touch sensor layer TSL. That is, the compensation film SF is configured to control the position of the neutral plane formed inside the flexible display panel 200 when the bending moment is applied to the flexible display panel 200.

The compensation film SF includes the decoration pattern DP which covers the wiring unit WI. The decoration pattern DP is positioned to correspond to the wiring unit WI of the touch sensor layer TSL and may be formed on the upper surface and the lower surface of compensation film SF or inside the compensation film SF. The decoration pattern DP is a light blocking member and the decoration pattern DP is positioned to correspond to the wiring unit WI to suppress the wiring unit WI of the touch sensor layer TSL from being visualized from the outside. The decoration pattern DP is formed on the compensation film SF contacting the touch sensor layer TSL, and therefore even though the overall flexible display device 1000 is bent, the wiring unit WI of the touch sensor layer TSL is suppressed from being visualized from the outside.

In the flexible display device 1000 according to an embodiment, when the bending moment is applied to the flexible display device 1000, the second viscoelastic layer 400 is deformed depending on the stress applied to the flexible display device 1000 due to the unique characteristics of the viscoelastic materials of the second viscoelastic layer 400, and therefore different neutral planes are formed on the flexible window 500 and the flexible display panel 200, respectively, such that the stress applied to the whole flexible display device 1000 is relaxed.

In this case, the position of the neutral plane NP formed on the flexible display panel 200 is controlled by the compensation film SF, and thus the neutral plane NP is formed on the touch sensor layer TSL. The neutral plane NP is formed on the touch sensor layer TSL, and thus when the bending moment is applied to the flexible display device 1000, the touch sensor layer TSL is bent while keeping an original length without being expanded or contracted due to unique characteristics of the neutral plane NP, such that even though stress is repeatedly applied to the flexible display device 1000 or stress over breaking strength is applied to the flexible display device 1000, the touch sensor layer TSL is prevented from being broken due to the stress.

In detail, the touch sensor unit SE of the touch sensor layer TSL is made of the transparent conductive oxide having brittleness as compared with metal and thus may be easily broken by the stress, but in the flexible display device 1000 according to an embodiment, when the bending moment is applied, the second viscoelastic layer 400 is deformed and thus different neutral planes are formed on the flexible window 500 and the flexible display panel 200, respectively, such that the stress applied to the whole flexible display device 1000 is relaxed, and at the same time, the neutral plane NP formed on the flexible display panel 200 is formed on the touch sensor unit SE, such that the touch sensor unit SE of the touch sensor layer TSL is prevented from being broken due to the stress.

That is, the flexible display device 1000 having improved durability against repetitive bending is provided.

Further, in the flexible display device 1000 according to an embodiment, the compensation film SF includes the decoration pattern DP positioned to correspond to the wiring unit WI of the touch sensor unit SE to prevent the wiring unit WI from being visualized from the outside, and therefore an additional configuration for preventing the wiring unit WI from being visualized from the outside is not required. As such, the wiring unit WI of the touch sensor layer TSL is blocked by the decoration pattern DP of the compensation film 100 and thus the position of the end of the flexible display panel 200 may move independent of the position of the blocking member 510 of the flexible window 500, such that the width of the non-display area of the whole flexible display device 1000 may be narrow.

Further, the wiring unit WI of the flexible display panel 200 is blocked by the decoration pattern DP of the flexible display panel 200 itself and thus the wiring unit WI of the flexible display panel 200 is prevented from being visualized from the outside independent of the position of the blocking member 510 of the flexible window 500, such that the blocking member 510 of the flexible window 500 need not overlap the wiring unit WI.

While some embodiments have been described, possible embodiments are not limited to the described embodiments. Embodiments are intended to cover various modifications and equivalent arrangements that are within the spirit and scope of the appended claims.

What is claimed is:

1. A flexible display device, comprising:
    a flexible display panel;
    a flexible touch panel overlapping the flexible display panel and including a touch sensor layer overlapping the flexible display panel, a flexible substrate contacting the touch sensor layer, and a covering member contacting the flexible substrate, wherein the touch sensor layer comprises a touch sensor unit and a wiring unit electrically connected to the touch sensor unit;
    an opaque covering member concealing the wiring unit without concealing the touch sensor unit;
    a compensation film overlapping both the touch sensor unit and the wiring unit, disposed between the flexible display panel and the flexible substrate, and configured to enable a neutral plane associated with the flexible display device to be positioned in the touch sensor layer when the flexible display device is bent; and
    an opaque blocking member that overlaps a non-display area of the flexible display panel,
    wherein the flexible substrate is positioned between the wiring unit and the opaque covering member, and
    wherein the opaque blocking member partially overlaps the opaque covering member.

2. The flexible display device of claim 1, wherein:
    the compensation film includes an organic layer and an inorganic layer.

3. The flexible display device of claim 1, further comprising:
    a viscoelastic layer positioned between the compensation film and the flexible display panel.

4. The flexible display device of claim 1, further comprising:
    a flexible transparent window overlapping the touch sensor layer; and
    a viscoelastic layer positioned between the touch sensor layer and the flexible transparent window.

5. The flexible display device of claim 4, wherein the opaque blocking member directly contacts the flexible transparent window, and
    the opaque blocking member partially overlaps the wiring unit without completely overlapping the wiring unit.

6. The flexible display device of claim 1, wherein:
    the opaque covering member includes a comb pattern.

7. The flexible display device of claim 1, further comprising: a viscoelastic layer that overlaps the touch sensor layer, wherein:
    the opaque covering member is positioned inside the viscoelastic layer.

8. The flexible display device of claim 7, wherein:
    the viscoelastic layer directly contacts the flexible touch panel.

* * * * *